(12) United States Patent  
Kim

(10) Patent No.: US 9,008,881 B2  
(45) Date of Patent: Apr. 14, 2015

(54) METHOD AND SYSTEM FOR CONTROLLING HYBRID VEHICLE

(71) Applicants: Hyundai Motor Company, Seoul (KR); Kia Motors Corporation, Seoul (KR)

(72) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/067,114

(22) Filed: Oct. 30, 2013

(65) Prior Publication Data

US 2014/0163791 A1    Jun. 12, 2014

(30) Foreign Application Priority Data

Dec. 7, 2012   (KR) .......................... 10-2012-0142066

(51) Int. Cl.
| | |
|---|---|
| *B60W 10/00* | (2006.01) |
| *B60L 11/00* | (2006.01) |
| *B60W 20/00* | (2006.01) |
| *B60W 10/02* | (2006.01) |
| *B60W 10/06* | (2006.01) |

(52) U.S. Cl.
CPC .............. *B60W 20/00* (2013.01); *B60W 10/02* (2013.01); *B60W 10/06* (2013.01); *B60W 2600/00* (2013.01); *Y10S 903/93* (2013.01)

(58) Field of Classification Search
USPC .............. 701/22, 36, 51; 180/65.265, 65.275, 180/65.28, 65.285, 65.6, 65.8; 477/34, 70, 477/77, 79, 90–91
See application file for complete search history.

(56) References Cited

U.S. PATENT DOCUMENTS

| | | | |
|---|---|---|---|
| 6,319,164 B1* | 11/2001 | Runde et al. ................... | 475/116 |
| 2005/0076958 A1* | 4/2005 | Foster et al. ................... | 137/596 |
| 2006/0011394 A1* | 1/2006 | Colvin et al. ................ | 180/65.2 |
| 2013/0218389 A1* | 8/2013 | Tanishima et al. .............. | 701/22 |
| 2013/0261912 A1* | 10/2013 | Arai ............................... | 701/60 |

FOREIGN PATENT DOCUMENTS

| | | |
|---|---|---|
| JP | 2011037317 A | 2/2011 |
| KR | 10-0974753 | 8/2010 |
| KR | 10-1040350 | 6/2011 |

* cited by examiner

*Primary Examiner* — Yonel Beaulieu  
(74) *Attorney, Agent, or Firm* — Mintz Levin Cohn Ferris Glovsky and Popeo, P.C.; Peter F. Corless

(57) ABSTRACT

Disclosed herein is a method and system for controlling a hybrid vehicle that can run a hybrid vehicle while preventing an engine stall when an engine clutch which controls power transmission between an engine and a motor is in a stuck-breakdown condition. The method of controlling a hybrid vehicle, which includes an engine clutch controlling power transmission between an engine and a motor, and a transmission clutch connecting the motor and an input shaft of a transmission, includes: determining whether the engine clutch is in a stuck-breakdown condition, and controlling the engine and the transmission clutch to maintain speed of the engine above a predetermined target idle RPM according to demand torque of the hybrid vehicle when the engine clutch is in a stuck-breakdown condition.

15 Claims, 4 Drawing Sheets

RELATED ART

METHOD AND SYSTEM FOR CONTROLLING HYBRID VEHICLE

CROSS-REFERENCE TO RELATED APPLICATION

This application claims priority to and the benefit of Korean Patent Application No. 10-2012-0142066 filed in the Korean Intellectual Property Office on Dec. 7, 2012, the entire contents of which are incorporated herein by reference.

BACKGROUND (a) Technical Field

The present disclosure relates to a method and a system for controlling a hybrid vehicle, and more particularly, to a method and a system for controlling a hybrid vehicle that can run a hybrid vehicle while preventing an engine stall when an engine clutch which controls power transmission between an engine and a motor is in a stuck-breakdown condition.

(b) Description of the Related Art

Hybrid electric vehicles operate through the use of power from an internal combustion engine and power from a battery. In particular, hybrid vehicles are designed to efficiently combine and use power of the internal combustion engine and the motor.

For example, as illustrated in FIG. 1, a hybrid vehicle includes an engine 10, a motor 20, an engine clutch 30, a transmission 40, a differential gear unit 50, a battery 60, an integrated starter-generator (ISG) 70, and wheels 80. The engine clutch 30 controls power transmission between the engine 10 and the motor 20, and the integrated starter-generator (ISG) 70 starts the engine 10 or generates electric power by output torque of the engine 10.

As further shown, the hybrid vehicle includes: a hybrid control unit (HCU) 200 which controls overall operation of the hybrid electric vehicle; an engine control unit (ECU) 110 which controls operation of the engine 10; a motor control unit (MCU) 120 which controls operation of the motor 20; a transmission control unit (TCU) 140 which controls operation of the transmission 40; and a battery control unit (BCU) 160 which manages and controls the battery 60. The battery control unit 160 may also be referred to as a battery management system (BMS). The integrated starter-generator 70 may also be referred to as a starting/generating motor or a hybrid starter-generator.

The hybrid vehicle may run in a driving mode, such as an electric vehicle (EV) mode only using power of the motor 20, a hybrid electric vehicle (HEV) mode using torque of the engine 10 as main power and torque of the motor 20 as auxiliary power, and a regenerative braking (RB) mode during braking or when the vehicle runs by inertia. In the RB mode, braking and inertia energy are collected through power generation of the motor 20, and the battery 60 is charged with the collected energy.

As described above, the hybrid vehicle uses both mechanical energy of the engine and electrical energy of a battery, uses optimal operation regions of the engine and the motor, and recovers the energy of the motor during braking, thereby increasing fuel and energy efficiency. However, when an engine clutch which controls power transmission between an engine and a motor is in a stuck-breakdown condition, it may be difficult for the hybrid vehicle to normally run.

The stuck-breakdown condition of the engine clutch is a breakdown condition in which friction materials of the engine clutch are stuck together, so the engine clutch always maintains a lock-up state, because of trouble of operating elements of the engine clutch and overheating of the engine clutch. When an engine clutch is in a stuck-breakdown condition, since an engine and a motor are continuously connected and rotate at same rotation speed, an engine stall may occur in a state equal to or lower than an engine idle RPM (revolutions per minute). When an engine stall occurs, it may be difficult for a hybrid vehicle to run normally.

The above information disclosed in this Background section is only for enhancement of understanding of the background of the disclosure, and therefore, it may contain information that does not form the related art that is already known to a person of ordinary skill in the art.

SUMMARY

The present disclosure has been made in an effort to provide a method and a system for controlling a hybrid vehicle having advantages of being able to run a hybrid vehicle while preventing an engine stall when an engine clutch which controls power transmission between an engine and a motor is in a stuck-breakdown condition.

An exemplary embodiment of the present disclosure provides a method of controlling a hybrid vehicle which includes an engine clutch controlling power transmission between an engine and a motor, and a transmission clutch connecting the motor and an input shaft of a transmission, the method including: determining whether the engine clutch is in a stuck-breakdown condition, and controlling the engine and the transmission clutch to maintain speed of the engine above a predetermined target idle RPM according to demand torque of the hybrid vehicle when the engine clutch is in a stuck-breakdown condition.

The above-referenced method further includes injecting fuel into the engine to maintain the speed of the engine above the predetermined target idle RPM. The controlling of the engine and the transmission clutch includes opening the transmission clutch when the demand torque is under a predetermined value and the speed of the engine is under the predetermined target idle RPM. The controlling of the engine and the transmission clutch further includes locking-up the transmission clutch when the demand torque is under the predetermined value and the speed of the engine is over the predetermined target idle RPM. The controlling of the engine and the transmission clutch further includes slip-controlling the transmission clutch to launch the hybrid vehicle when the demand torque is over the predetermined value and the speed of the engine is under the predetermined target idle RPM. The controlling of the engine and the transmission clutch further includes locking-up the transmission clutch when the demand torque is over the predetermined value and the speed of the engine is over the predetermined target idle RPM.

Another embodiment of the present disclosure provides a system for controlling a hybrid vehicle running by a combination of power of an engine and power of a motor, the system including: an engine clutch configured to control power transmission between the engine and the motor, a transmission clutch configured to connect the motor and an input shaft of a transmission, such that the transmission clutch is installed in the transmission, and a control unit configured to control the engine and the transmission clutch to maintain speed of the engine above a predetermined target idle RPM according to demand torque of the hybrid vehicle when the engine clutch is in a stuck-breakdown condition. The control unit is operated by a predetermined program, and the determined program includes a series of commands for executing a method of controlling a hybrid vehicle including: determining whether the engine clutch is in a stuck-breakdown condition, and controlling the engine and the transmission clutch to maintain speed of the engine above a predetermined target idle RPM according to demand torque of the hybrid vehicle when the engine clutch is in a stuck-breakdown condition.

As described above, according to an embodiment of the present disclosure, it is possible to run a hybrid vehicle with preventing an engine stall when an engine clutch which controls power transmission between an engine and a motor is in a stuck-breakdown condition.

DETAILED DESCRIPTION OF THE EMBODIMENTS

Figure 1:
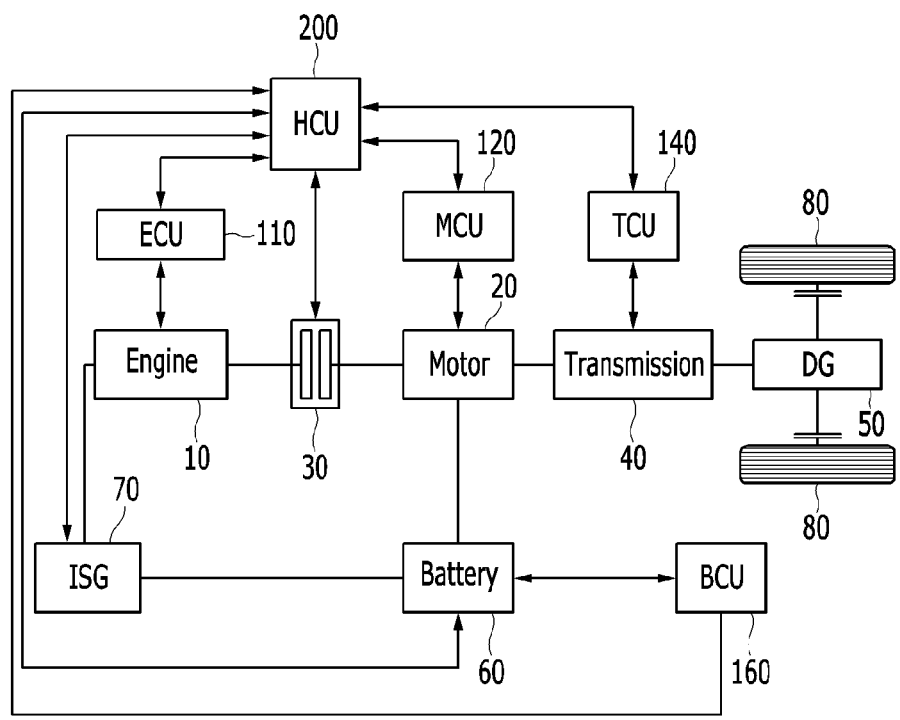
FIG. 1 is an exemplary schematic diagram illustrating a configuration of a typical hybrid vehicle.

Hereinafter, exemplary embodiments of the present disclosure will be described in detail with reference to the accompanying drawings. As those skilled in the art would realize, the described embodiments may be modified in various different ways, all without departing from the spirit or scope of the present disclosure. Throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Also, throughout the specification, when it is described that a unit "includes" a constituent element, it means that the unit may further include other constituent elements in addition to the element unless specifically referred to the contrary. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one control unit. The term "control unit" refers to a hardware device that includes a memory and a processor. The memory is configured to store program instructions and the processor is specifically configured to execute said program instructions to perform one or more processes which are described further below.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a schematic diagram illustrating a configuration of a typical hybrid vehicle to which a system according to an exemplary embodiment of the present disclosure may be applied. As illustrated in FIG. 1, the typical hybrid vehicle may include: an engine 10, a motor 20, an engine clutch 30 configured to control power transmission between the engine 10 and the motor 20, a transmission 40, a differential gear unit 50, a battery 60, and an integrated starter-generator (ISG) 70 configured to start the engine 10 or generate electric power by output of the engine 10.

As further shown, the typical hybrid vehicle may be applied may include: a hybrid control unit (HCU) 200 which controls overall operation of the hybrid electric vehicle; an engine control unit (ECU) 110 which controls operation of the engine 10; a motor control unit (MCU) 120 which controls operation of the motor 20; a transmission control unit (TCU) 140 which controls operation of the transmission 40; and a battery control unit (BCU) 160 which manages and controls the battery 60.

Figure 2:
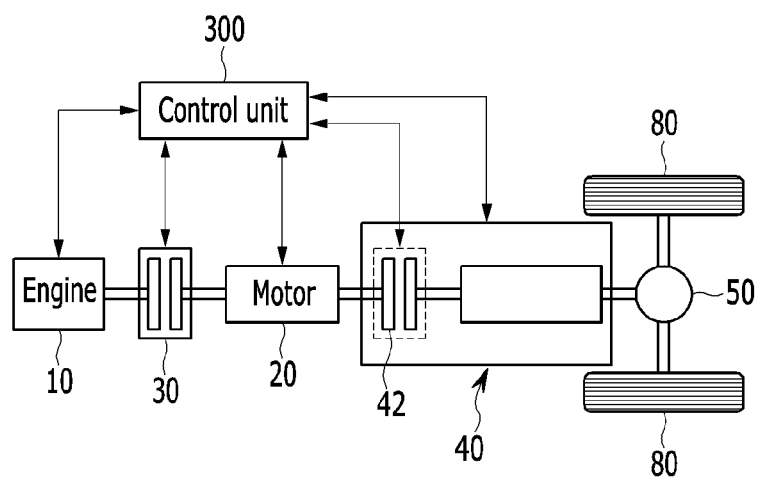
FIG. 2 is an exemplary configuration diagram of a system for controlling a hybrid vehicle according to an exemplary embodiment of the present disclosure.

FIG. 2 is a configuration diagram of a system for controlling a hybrid vehicle according to an exemplary embodiment of the present disclosure. The system controls a transmission clutch to make the hybrid vehicle run when an engine clutch is in a stuck-breakdown condition.

The system for controlling the hybrid vehicle according to the exemplary embodiment of the present disclosure includes: an engine clutch 30 configured to control power transmission between the engine 10 and the motor 20; a transmission clutch 42 configured to connect the motor 20 and an input shaft of a transmission 40, wherein the transmission clutch 42 is installed in the transmission 40; and a control unit 300 configured to control the engine 10 and the transmission clutch 42 to keep speed of the engine 10 above a predetermined target idle RPM according to demand torque of the hybrid vehicle when the engine clutch 30 is in a stuck-breakdown condition. Since the engine 10, the motor 20, the engine clutch 30, the transmission 40, and the transmission clutch 42 are generally installed in typical hybrid vehicles, their detailed description will be omitted in the present specification.

The control unit 300 may include one or more processors or microprocessors and/or hardware operated by a program including a series of commands for executing a method of controlling a hybrid vehicle according to an exemplary embodiment of the present disclosure which will be described below. In the exemplary embodiment of the present disclosure, the control unit 300, as illustrated in FIG. 1, may include an engine control unit (ECU) for controlling operation of the engine 10 of the hybrid vehicle, a motor control unit (MCU) for controlling operation of the motor 20, a transmission control unit (TCU) for controlling operation of the transmission 40, and a hybrid control unit (HCU) for controlling general operation of the hybrid vehicle.

In the exemplary method of controlling the hybrid vehicle according to the exemplary embodiment of the present disclosure which will be described below, some processes may be performed by the control unit 300, other processes may be performed by the ECU, and yet further processes may be performed by the MCU, TCU, or HCU. However, it should be understood that the scope of the present disclosure is not limited to the exemplary embodiment to be described below. The control unit may be implemented with a different combination from that described in the exemplary embodiment of the present disclosure. Further, the control unit 300, the ECU, the MCU, the TCU, and the HCU may perform a different combination of processes from that described in the exemplary embodiment of the present disclosure.

Hereinafter, a method of controlling a hybrid vehicle according to an exemplary embodiment of the present disclosure will be described in detail with reference to the accompanying drawings.

Figure 3:
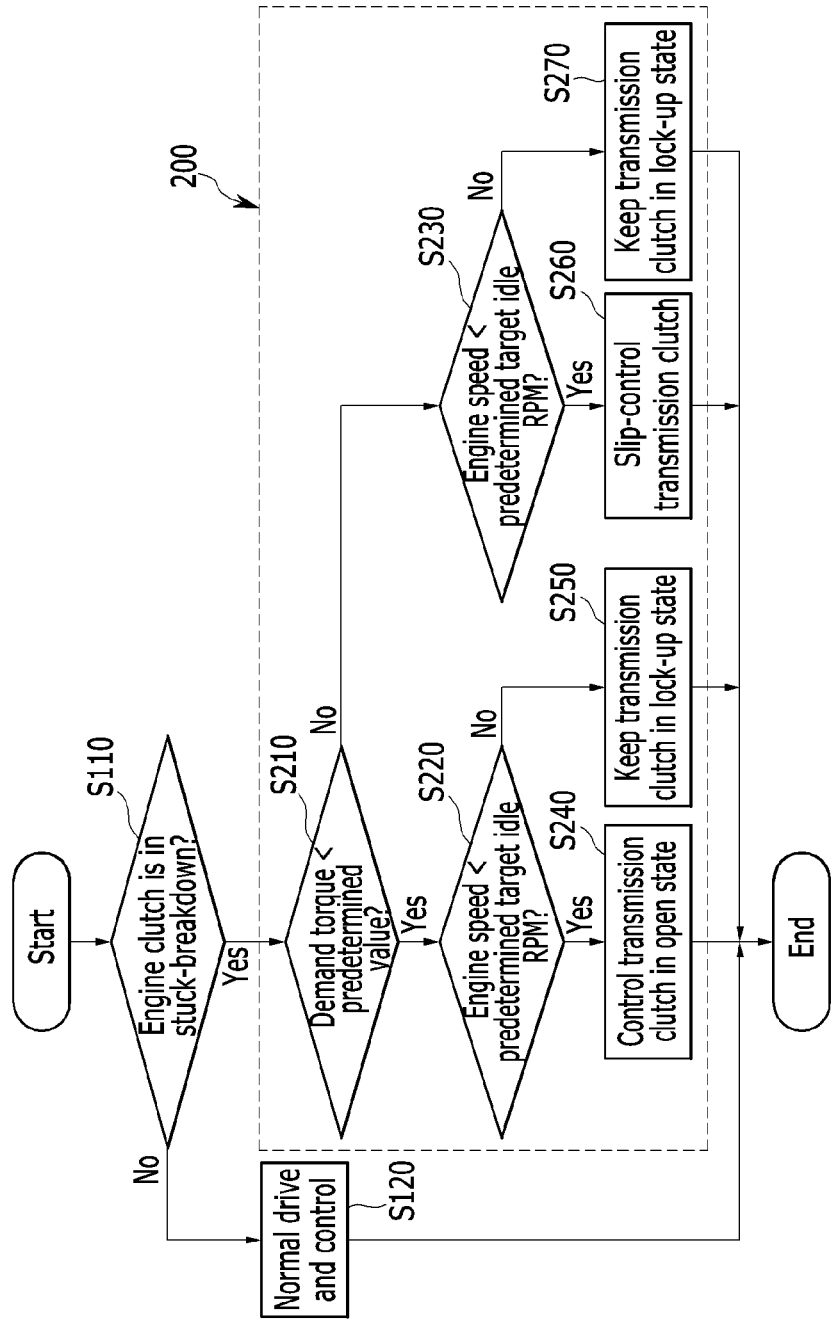
FIG. 3 is an exemplary flowchart of a method of controlling a hybrid vehicle according to an exemplary embodiment of the present disclosure.

FIG. 3 is a flowchart of a method of controlling a hybrid vehicle according to an exemplary embodiment of the present disclosure. As illustrated in FIG. 3, the control unit 300 determines whether the engine clutch 30 is in a stuck-breakdown condition (S110). The control unit 300 may determine whether the engine clutch 30 is in a stuck-breakdown condition based on a transmitting signal and/or receiving signal of the HCU 200 illustrated in FIG. 1. The HCU 200 transmits and/or receives signals associated with controlling and failure diagnosing of the engine clutch 30.

In step S110, when it is determined that the engine clutch 30 is normal, the control unit 300 drives and controls the hybrid vehicle together with the HCU, the ECU, the MCU, the TCU, and so on (S120). Conversely, when it is determined that the engine clutch 30 is in a stuck-breakdown condition, as the control unit 300 injects fuel in the engine 10, the control unit 300 controls the engine 10 and the transmission clutch 42 to maintain speed of the engine 10 above a predetermined target idle RPM according to demand torque for running of the hybrid vehicle (200). That is, when the demand torque decreases and becomes under a predetermined value and current speed of the engine is under a predetermined target idle RPM (e.g., 1000 RPM), the control unit 300 opens the transmission clutch 42 (S210, S220, and S240). The predetermined value for the demand torque may be set based on torque that does not require launching of the hybrid vehicle.

In step S240, when the control unit 300 opens the transmission clutch 42, because driving torque transmitted to a driving shaft is removed, the control unit 300 may easily maintain the speed of the engine 10 at an idle RPM.

Figure 4:
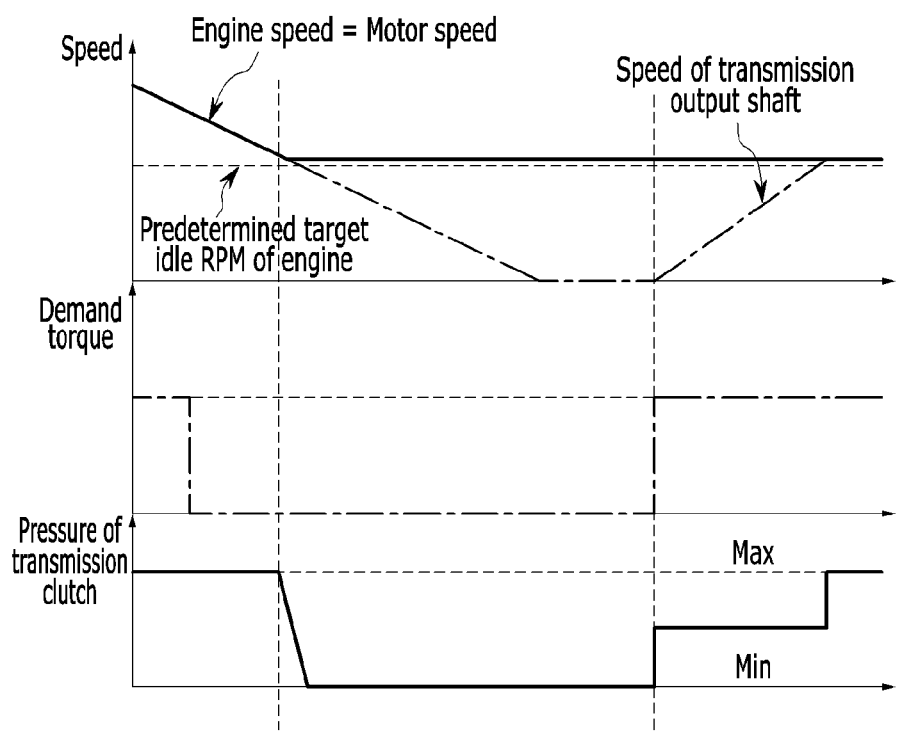
FIG. 4 is an exemplary graph for explaining operation of an exemplary embodiment of the present disclosure.

Referring to FIG. 4, it can be observed that when the demand torque decreases and so the hybrid vehicle speed decreases, the control unit 300 controls the transmission clutch 42 to be opened to maintain the speed of the engine 10 above the predetermined target idle RPM. Also, when the demand torque decreases and becomes lower than the predetermined value, and the current speed of the engine is over the predetermined target idle RPM, the control unit 300 keeps the transmission clutch 42 in a lock-up state (S210, S220, and S250). In this case, since the current speed of the engine 10 is not under the predetermined target idle RPM which may cause an engine stall, the control unit 300 keeps the transmission clutch 42 in the lock-up state. Further, when the demand torque is over the predetermined value, and current speed of the engine 10 is under the predetermined target idle RPM, the control unit 300 slip-controls the transmission clutch 42 for launching of the hybrid vehicle (S210, S230, and S260).

Referring to FIG. 4, it can be observed that the control unit 300 slip-controls the transmission clutch 42 for the launching of the hybrid vehicle. When the demand torque is over the predetermined value, it may correspond to when a driver pushes an acceleration pedal to launch the hybrid vehicle. When the driver pushes the acceleration pedal, since fuel injections corresponding to pushing the acceleration pedal increase, and thus speed of the engine 10 increases, the control unit 300 may slip-control the transmission clutch 42 for the launching of the hybrid vehicle.

Conversely, when the demand torque is over the predetermined value, and the speed of the engine is over the predetermined target idle RPM, it corresponds to a general running state, the control unit 300 keeps the transmission clutch 42 in a lock-up state (S210, S230, and S270).

Accordingly, it is possible to run a hybrid vehicle while preventing an engine stall when an engine clutch is in a stuck-breakdown condition.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

<Description of Reference Numerals>

| | |
|---|---|
| 10: Engine | 20: Motor |
| 30: Engine clutch | 40: Transmission |
| 42: Transmission clutch | 300: Control unit |

What is claimed is:

1. A method of controlling a hybrid vehicle which includes an engine clutch controlling power transmission between an engine and a motor, and a transmission clutch connecting the motor and an input shaft of a transmission, the method comprising:
determining, by a control unit, whether the engine clutch is in a stuck-breakdown condition;
controlling, by the control unit, the engine and the transmission clutch to maintain speed of the engine above a predetermined target idle RPM according to demand torque of the hybrid vehicle when the engine clutch is in the stuck-breakdown condition; and
injecting, by the control unit, fuel into the engine to maintain the speed of the engine above the predetermined target idle RPM.

2. The method of claim 1, wherein the controlling of the engine and the transmission clutch comprises opening the transmission clutch when the demand torque is under a predetermined value and the speed of the engine is under the predetermined target idle RPM.

3. The method of claim 1, wherein the controlling of the engine and the transmission clutch comprises locking-up the transmission clutch when the demand torque is under a predetermined value and the speed of the engine is over the predetermined target idle RPM.

4. The method of claim 1, wherein the controlling of the engine and the transmission clutch comprises slip-controlling the transmission clutch to launch the hybrid vehicle when the demand torque is over a predetermined value and the speed of the engine is under the predetermined target idle RPM.

5. The method of claim 1, wherein the controlling of the engine and the transmission clutch comprises locking-up the transmission clutch when the demand torque is over a predetermined value and the speed of the engine is over the predetermined target idle RPM.

6. A system for controlling a hybrid vehicle running by combination of power of an engine and power of a motor, the system comprising:
an engine clutch configured to control power transmission between the engine and the motor;

a transmission clutch configured to connect the motor and an input shaft of a transmission, wherein the transmission clutch is installed in the transmission; and a control unit configured to control the engine and the transmission clutch to maintain speed of the engine above a predetermined target idle RPM according to demand torque of the hybrid vehicle when the engine clutch is in a stuck-breakdown condition, wherein the control unit is operated by a predetermined program, and the predetermined program includes a series of commands for executing a method of controlling a hybrid vehicle comprising:

determining whether the engine clutch is in a stuck-breakdown condition;

controlling the engine and the transmission clutch to maintain the speed of the engine above the predetermined target idle RPM according to the demand torque of the hybrid vehicle when the engine clutch is in the stuck-breakdown condition; and injecting fuel into the engine to maintain the speed of the engine above the predetermined target idle RPM.

7. The system of claim 6, wherein the controlling of the engine and the transmission clutch comprises opening the transmission clutch when the demand torque is under a predetermined value and the speed of the engine is under the predetermined target idle RPM.

8. The system of claim 6, wherein the controlling of the engine and the transmission clutch comprises locking-up the transmission clutch when the demand torque is under a predetermined value and the speed of the engine is over the predetermined target idle RPM.

9. The system of claim 6, wherein the controlling of the engine and the transmission clutch comprises slip-controlling the transmission clutch to launch the hybrid vehicle when the demand torque is over a predetermined value and the speed of the engine is under the predetermined target idle RPM.

10. The system of claim 6, wherein the controlling of the engine and the transmission clutch comprises locking-up the transmission clutch when the demand torque is over a predetermined value and the speed of the engine is over the predetermined target idle RPM.

11. A non-transitory computer readable medium containing program instructions for controlling a hybrid vehicle, which includes an engine clutch controlling power transmission between an engine and a motor, and a transmission clutch connecting the motor and an input shaft of a transmission, the computer readable medium comprising:

program instructions that determine whether the engine clutch is in a stuck-breakdown condition;

program instructions that control the engine and the transmission clutch to maintain speed of the engine above a predetermined target idle RPM according to demand torque of the hybrid vehicle when the engine clutch is in the stuck-breakdown condition; and program instructions that inject fuel into the engine to maintain the speed of the engine above the predetermined target idle RPM.

12. The computer readable medium of claim 11, wherein the program instructions that control the engine and the transmission clutch comprise program instructions that open the transmission clutch when the demand torque is under a predetermined value and the speed of the engine is under the predetermined target idle RPM.

13. The computer readable medium of claim 11, wherein the program instructions that control the engine and the transmission clutch comprise program instructions that lock-up the transmission clutch when the demand torque is under a predetermined value and the speed of the engine is over the predetermined target idle RPM.

14. The computer readable medium of claim 11, wherein the program instructions that control the engine and the transmission clutch comprise program instructions that slip-control the transmission clutch to launch the hybrid vehicle when the demand torque is over a predetermined value and the speed of the engine is under the predetermined target idle RPM.

15. The computer readable medium of claim 11, wherein the program instructions that control the engine and the transmission clutch comprise program instructions that lock-up the transmission clutch when the demand torque is over a predetermined value and the speed of the engine is over the predetermined target idle RPM.

* * * * *